US012749995B2

United States Patent
(12) United States Patent
Suzuki et al.

(10) Patent No.: US 12,749,995 B2
(45) Date of Patent: Sep. 29, 2026

(54) CONTROL DEVICE, CONTROL METHOD, AND CONTROL SYSTEM

(71) Applicants: Kabushiki Kaisha Toshiba, Tokyo (JP); Toshiba Electronic Devices & Storage Corporation, Tokyo (JP)

(72) Inventors: Koji Suzuki, Fuchu Tokyo (JP); Yutaka Yamada, Fuchu Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 150 days.

(21) Appl. No.: 18/771,628

(22) Filed: Jul. 12, 2024

(65) Prior Publication Data

US 2025/0096710 A1 Mar. 20, 2025

(30) Foreign Application Priority Data

Sep. 14, 2023 (JP) ................................ 2023-149460

(51) Int. Cl.

*H02P 21/20* (2016.01)
*H02P 7/03* (2016.01)
*H02P 21/00* (2016.01)
*H02P 21/14* (2016.01)
*H02P 21/22* (2016.01)

(52) U.S. Cl.

CPC ................ *H02P 21/22* (2016.02); *H02P 7/03* (2016.02); *H02P 21/0021* (2013.01); *H02P 21/14* (2013.01)

(58) Field of Classification Search

CPC ...... H02P 21/14; H02P 21/22; H02P 21/0021; H02P 7/03
USPC .................................................... 318/400.02
See application file for complete search history.

(56) References Cited

U.S. PATENT DOCUMENTS

| | | | | |
|---|---|---|---|---|
| 8,446,115 | B2 | 5/2013 | Yabuguchi et al. | |
| 9,590,551 | B2 * | 3/2017 | Omata | H02P 21/26 |
| 2008/0203964 | A1 * | 8/2008 | Koike | G03G 15/5008 318/434 |
| 2013/0214710 | A1 * | 8/2013 | Omata | H02P 21/22 318/400.02 |
| 2017/0153614 | A1 * | 6/2017 | Namie | G05B 13/0265 |

(Continued)

FOREIGN PATENT DOCUMENTS

| | | | |
|---|---|---|---|
| JP | 2002-191198 | A | 7/2002 |
| JP | 2011-223724 | A | 11/2011 |
| JP | 2013-172550 | A | 9/2013 |

*Primary Examiner* — Gabriel Agared
(74) *Attorney, Agent, or Firm* — Kim & Stewart LLP

(57) ABSTRACT

According to the present embodiment, a control device controlling a control target is provided which includes a first controller, a second controller, a detector, and a corrector. The first controller is configured to, by using a first measured value measured for the control target and a first command value that is a target value of the first measured value as inputs, generate a second command value. The second controller is configured to, by using a second measured value measured for the control target and the second command value as inputs, generate a target value supplied to the control target as a third command value. The detector is configured to detect a change in the second measured value and to change a control mode. The corrector is configured to generate a second correction value and correct the second controller in accordance with the control mode.

20 Claims, 13 Drawing Sheets

(56) References Cited

U.S. PATENT DOCUMENTS

| | | | | |
|---|---|---|---|---|
| 2018/0167004 | A1* | 6/2018 | Suzuki | H02P 6/28 |
| 2020/0343844 | A1* | 10/2020 | Shouji | H02P 27/02 |
| 2021/0175827 | A1* | 6/2021 | Ohno | H02P 21/22 |
| 2024/0014754 | A1* | 1/2024 | Mori | H02P 27/085 |
| 2024/0097590 | A1* | 3/2024 | Yamada | H02P 23/0004 |

* cited by examiner

CONTROL DEVICE, CONTROL METHOD, AND CONTROL SYSTEM

CROSS-REFERENCE TO RELATED APPLICATIONS

This application is based upon and claims the benefit of priority from the prior Japanese Patent Application No. 2023-149460, filed on Sep. 14, 2023 the entire contents of which are incorporated herein by reference.

FIELD

The embodiments of the present invention relate to a control device, a control method, and a control system.

BACKGROUND

It is generally known to control a control target such as a motor by using a plurality of controllers. Inputs to one ends of the controllers include a command value output from the other end of any of the controllers. However, in a case where a change caused by an external factor, such as a change in load torque, occurs in the control target, the command value at one end of a controller may contradict the command value at the other end, so that control may become unstable.

DETAILED DESCRIPTION

Figure 1:
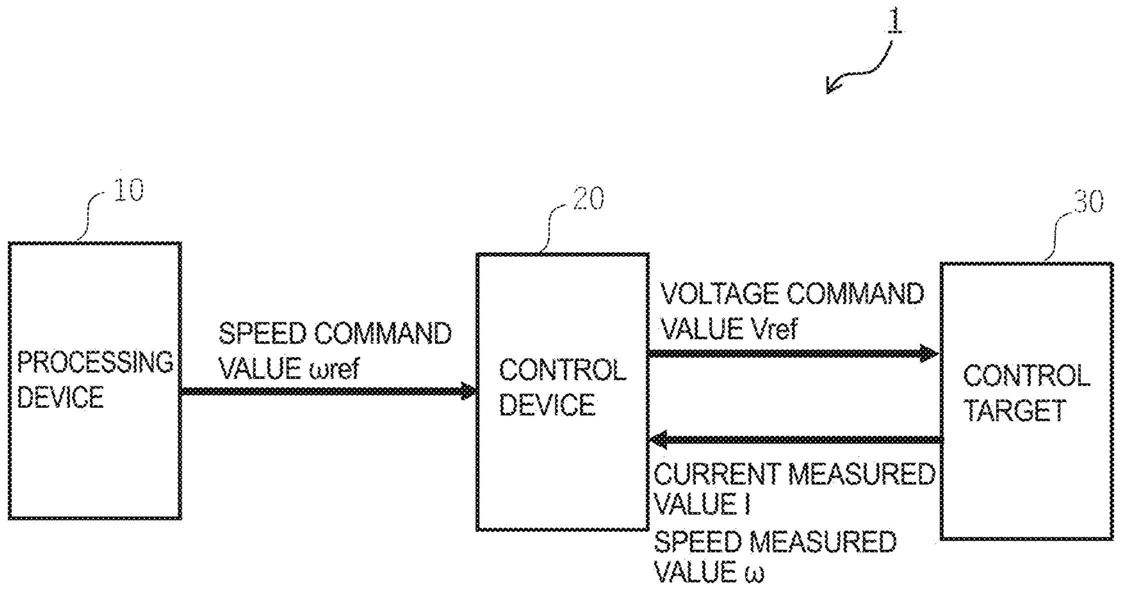
FIG. 1 is a diagram schematically illustrating an example of a control system according to an embodiment.

According to the present embodiment, a control device controlling a control target is provided, which includes a first controller, a second controller, a detector, and a corrector. The first controller is configured to, by using a first measured value measured for the control target and a first command value that is a target value of the first measured value as inputs, generate a second command value. The second controller is configured to, by using a second measured value measured for the control target and the second command value as inputs, generate a target value supplied to the control target as a third command value. The detector to configured to detect a change in the second measured value caused by an external factor of the control target and to change a control mode. The corrector configured to generate a second correction value and correct the second controller in accordance with the control mode.

The control device, a control method, and a control system according to the embodiment of the present invention will be explained below with reference to the drawings. The following embodiment is merely an example of the embodiments of the present invention and are not intended to limit the scope of the present invention. In the drawings referred to in the embodiments, same parts or parts having identical functions are denoted by like or similar reference characters and there is a case where redundant explanations thereof are omitted. Further, there are cases where dimensional ratios in the drawings are different from those of actual products for the sake of explanations and some part of configurations is omitted from the drawings.

FIG. 1 is a diagram schematically illustrating an example of a control system according to an embodiment. A control system 1 includes, for example, a processing device 10, a control device 20, and a control target 30. The control system 1 is a system that drives the control target 30. The control target 30 according to the embodiment is, for example, a DC motor, but is not limited thereto. A detailed configuration example of the control target 30 will be described later with reference to FIG. 10. In the present embodiment, the term "DC motor" may be used to include a DC motor, a sensor measuring the state of the DC motor, an inverter driving the DC motor, and the like (see FIG. 10).

The processing device 10 is, for example, a computer. The processing device 10 transmits a command value, such as a speed command value ωref, for driving the control target 30 to the control device 20. The speed command value ωref is a command value of a motor rotation number (rotation speed). The processing device 10 includes, for example, an input/output interface that performs data exchange with a user, and generates the command value for driving the control target 30 based on a value input by the user and outputs the command value to the control device 20. In a case where the control target 30 is a DC motor, the command value is, for example, the speed command value ωref. The processing device 10 may be a computer for automatically driving the control target 30 in an appropriate manner. In this case, the processing device 10 outputs an appropriate command value set by the processing device 10 to the control device 20.

The control device 20 is a control device controlling the control target 30, and generates a command value necessary for driving the control target 30 and outputs the generated command value to the control target 30. In a case where the control target 30 is a DC motor, the control device 20 generates, for example, a voltage command value Vref and outputs the generated voltage command value Vref to the control target 30. The voltage command value Vref is a target value of a voltage supplied to the control target 30.

Further, to the control device 20, a measured value acquired from an actual operation of the control target 30 is input from the control target 30 or a peripheral module thereof. In a case where the control target 30 is a DC motor, a current measured value I and a speed measured value ω are input to the control device 20, for example. As described above, the control device 20 generates the voltage command value Vref based on the speed command value ωref, the current measured value I, and the speed measured value ω that have been received and outputs the generated voltage command value Vref to the control target 30 in order to drive the control target 30 in accordance with the command value from the processing device 10. The speed measured value ω according to the present embodiment corresponds to a first measured value, the speed command value ωref corresponds to a first command value, the current measured value I corresponds to a second measured value, a current command value Iref described later corresponds to a second command value, and the voltage command value Vref corresponds to a third command value.

Figure 2:
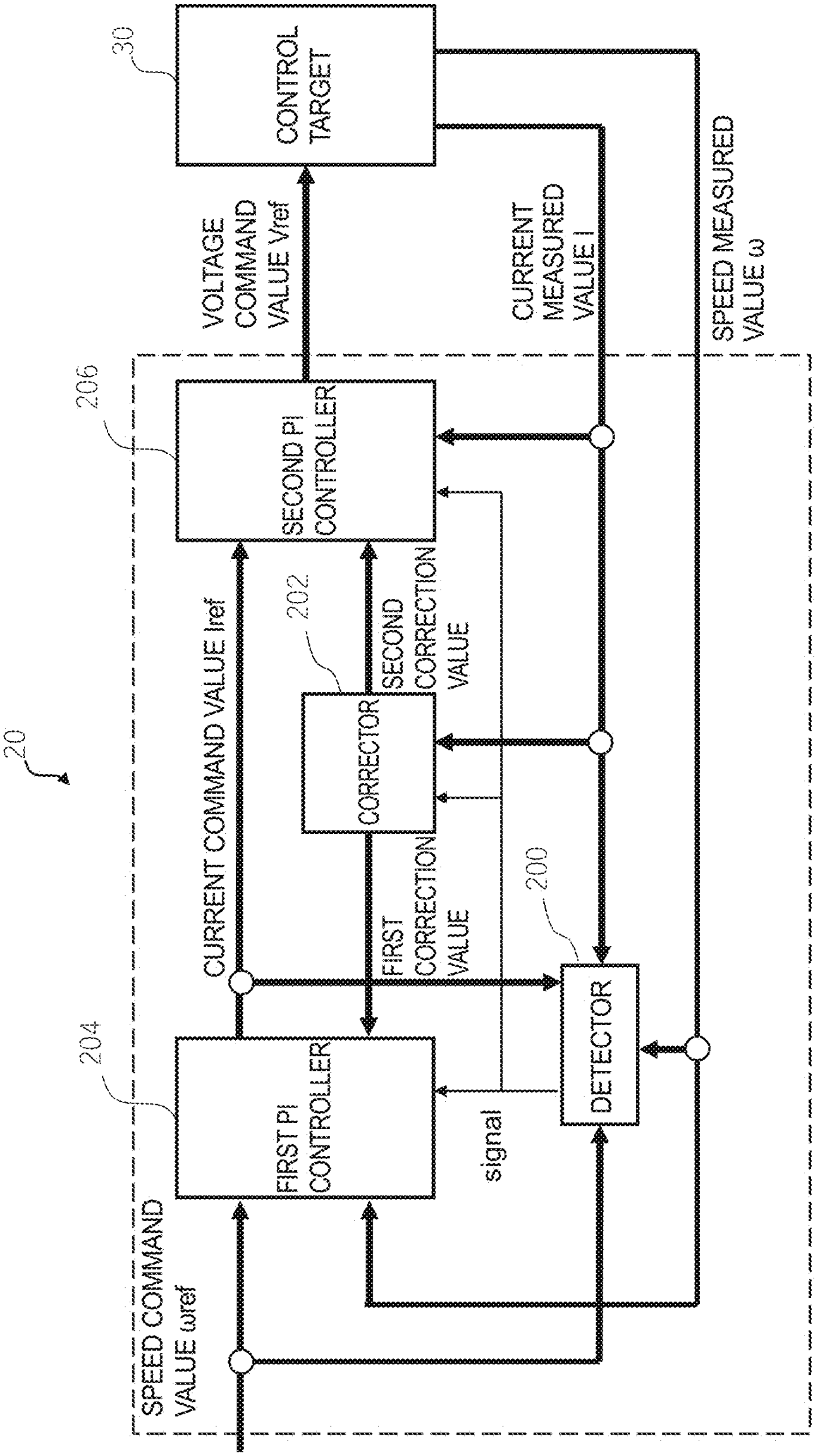
FIG. 2 is a block diagram illustrating a configuration example of a control device.
Figure 3:
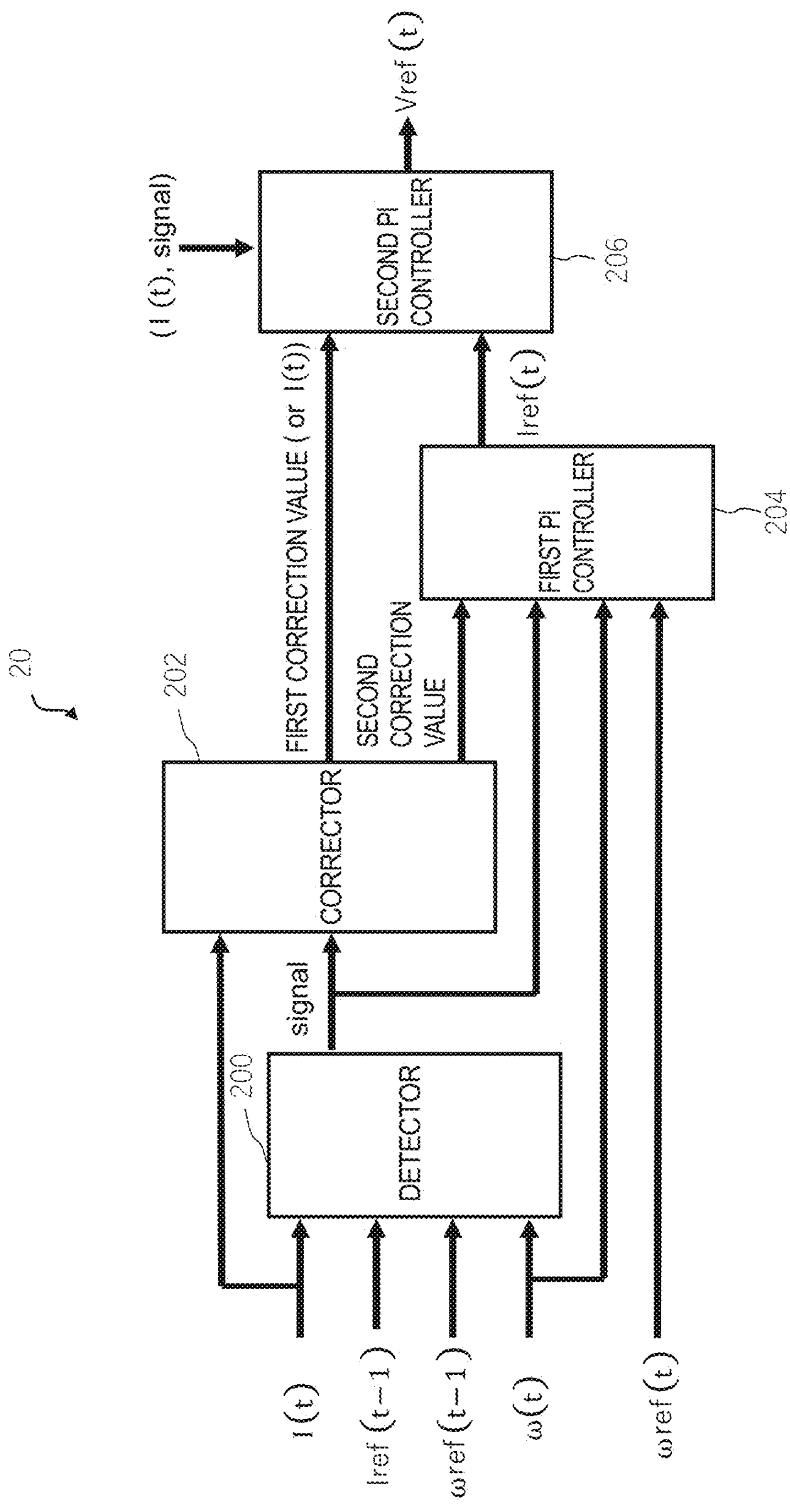
FIG. 3 is a diagram schematically illustrating the relation between signal inputs and outputs to and from respective components of the control device.

A detailed configuration example of the control device 20 is described here with reference to FIGS. 2 and 3. FIG. 2 is a block diagram illustrating a configuration example of the control device 20. As illustrated in FIG. 2, the control device 20 includes a detector 200, a corrector 202, a first PI controller 204, and a second PI controller 206. FIG. 3 is a diagram schematically illustrating the relation between signal inputs and outputs to and from arithmetic units of respective components of the control device 20. Control of the control target 30 executed by the control device 20 is, for example, feedback control in which a predetermined control cycle t is repeated, where t represents a chronological order of the control cycle in the feedback control. For example, when t is 1, the corresponding control cycle is the first cycle. When t is 2, the corresponding cycle is the second cycle. When t is 3, the corresponding cycle is the third cycle.

The control device 20 is a control device that controls the control target 30 and that can execute control while reducing the effect of a load change (disturbance) caused by an external factor of the control target 30. The control device 20 has a plurality of control modes in accordance with states of the control target 30.

The control modes are, for example, at least either a first mode (a normal mode) or a second mode (a correction mode). For example, the normal mode is a control mode in a state in which the load change caused by the external factor of the control target 30 falls within a predetermined range, and the correction mode is a control mode in a state in which the load change caused by the external factor of the control target 30 is out of the predetermined range.

The detector 200 detects a change in the current measured value I caused by disturbance of the control target 30 and changes the control mode. The detector 200 includes an arithmetic unit and a storage element and outputs a mode signal signal in accordance with the state of the control target 30. When the load change exceeds the predetermined range, the detector 200 outputs a mode signal signal indicating the correction mode. When the load change falls within the predetermined range, the detector 200 outputs a mode signal signal indicating the normal mode. That is, the detector 200 changes a present control cycle from the normal mode to the correction mode, when the present control cycle is the normal mode and the current measured value I changes regardless of a transition of the current command value Iref.

Further, the detector 200 generates an estimated value of the current measured value I in the present control cycle based on transitions of the current measured value I and the current command value Iref in past control cycles and, when the difference between the current measured value I and the estimated value is a threshold or more, changes the present control cycle from the normal mode to the correction mode. The detector 200 may estimate a range of the current measured value I in the present control cycle based on the transitions of the current measured value I and the current command value Iref in the past control cycles and, when the current measured value I is out of this range, may change the present control cycle from the normal mode to the correction mode.

In addition, the detector 200 changes the present control cycle from the correction mode to the normal mode, when the present control cycle is the correction mode and the sign of the difference value between the speed measured value ω and the speed command value ωref is changed. The detector 200 may change the present control cycle from the correction mode to the normal mode, when the present control cycle is the correction mode and the absolute value of the difference value between the speed measured value ω and the speed command value ωref becomes smaller than a predetermined value.

The detector 200 outputs false (=1) as the mode signal signal in the normal mode and outputs true (=2) in the correction node. That is, the detector 200 outputs the mode signal signal to the corrector 202, the first PI controller 204, and the second PI controller 206. Details of the detector 200 will be described later.

The corrector 202 includes an arithmetic unit and a storage element, and generates a first correction value Ic1 and corrects the first PI controller 204 in accordance with a control mode. The corrector 202 also generates a second correction value Ic2 and corrects the second PI controller 206 in accordance with the control mode. The corrector 202 outputs the current measured value I to the second PI controller 206 in the normal mode and outputs the second correction value Ic2 to the second PI controller 206 in the correction mode.

More specifically, when the present control cycle is changed from the normal mode to the correction mode, the corrector 202 retains and outputs the current measured value I measured in a period of a control cycle immediately before the present control cycle as the second correction value Ic2. The corrector 202 may retain and output the current measured value I in a period in which the change is a predetermined value or less among a plurality of past control cycles as the second correction value Ic2, when the present control cycle is changed from the normal mode to the correction mode. The corrector 202 may retain, for example, the current measured values I for past N cycles, retain as the second correction value Ic2 one of the retained current measured values which is a value before the current measured value I largely changes or an average value of the current measured values I that satisfy the same condition, and output the second correction value Ic2. Further, when the correction mode changes to the normal mode, the corrector 202 outputs the first correction value Ic1 based on the current measured value I in the present control cycle to the first PI controller 204.

In more detail, when the correction mode is changed to the normal mode, the corrector 202 outputs a correction value Ic1 represented by Expression (3) described later as the first correction value to the first PI controller 204 based on the mode signal signal from the detector 200. The corrector 202 can store therein current measured values I(t) in chronological order. The corrector 202 outputs a current measured value Ic2 that is a fixed value as the second correction value to the second PI controller 206 in the correction mode. Here, the current measured value Ic2 is, for example, a current measured value I(t−1) immediately before a load change occurs. For example, the current measured value Ic2 is the current measured value I(t−1) in the normal mode immediately before the normal mode is changed to the correction mode.

The first PI controller 204 is a controller that can execute feedback control by PID control. The first PI controller 204 generates a target value of a current as a current command value Iref(t) (the second command value) by using a speed measured value ω(t) (the first measured value) that is a measured rotation speed of the control target 30 and a speed command value ref (t) (the first command value) that is a target value of the speed measured value ω(t) as inputs. More specifically, in the normal mode, the first PI controller 204 executes PID control according to Expressions (1) and (2) based on the speed command value ωref(t) and the speed measured value ω(t) and outputs the current command value Iref(t). Expression (2) represents a term of error between the speed command value ωref(t) and the speed measured value ω(t). The first PI controller 204 includes an arithmetic unit and a storage element. K1 and K2 are constants. This storage element stores therein, for example, a measured value, a calculated value, and a coefficient necessary for calculation of Expressions (1) and (2). The first PI controller 204 according to the present embodiment corresponds to a first controller.

[Expression 1]

$$Iref(t) = K1e1(t) + K2\int_0^t e1(\tau)d\tau \tag{1}$$

[Expression 2]

$$e1(t) = \omega ref(t) - \omega(t) \tag{2}$$

Further, the first PI controller 204 stores therein the mode signal signal and, when the correction mode is switched to the normal mode, replaces an integral value in Expression (1) with the first correction value Ic1 according to Expression (3).

[Expression 3]

$$Ic1 = I(t)/K2 \tag{3}$$

Although the corrector 202 calculates the first correction value Ic1 in the present embodiment, this calculation is not limited thereto. The first PI controller 204 may perform calculation based on the mode signal signal.

As described above, the first PI controller 204 generates the current command value Iref(t) in the present control cycle t based on a present difference value e1(t) between the speed measured value ω(t) and the speed command value ωref(t) in the present control cycle t and an integral value obtained by integrating a past difference value e1(T) (where T is less than t) between a speed measured value ω(T) and a speed command value ωref(T) in a past control cycle. Further, when the correction mode is switched to the normal mode, the first PI controller 204 generates the current command value Iref(t) based on the present difference value e1(t) and the first correction value Ic1.

The second PI controller 206 is a controller that can execute feedback control by PID control. The second PI controller 206 generates a target value of a voltage supplied to the control target 30 as a voltage command value Vref (t) (the third command value) by using the current measured value I(t) (the second measured value) that is a measured current value of the control target 30 and the current command value Iref(t) (the second command value) as inputs.

More specifically, when the present control cycle t is the normal mode, the second PI controller 206 executes PID control according to Expressions (4) and (5) based on the current command value Iref(t) and the current measured value I(t) and outputs the voltage command value Vref (t). The second PI controller 206 includes an arithmetic unit and a storage element. K3 and K4 are constants. This storage element stores therein, for example, a measured value, a calculated value, and a coefficient necessary for calculation of Expressions (4) to (6). The second PI controller 206 according to the present embodiment corresponds to a second controller.

[Expression 4]

$$Vref(t) = K3e2(t) + K4\int_0^t e2(\tau)d\tau \tag{4}$$

[Expression 5]

$$e2(t) = Iref(t) - I(t) \tag{5}$$

In the correction mode, e2(t) according to Expression (6) is used in place of Expression (5). That is, when the present control cycle t is the correction mode, the second PI controller 206 generates the voltage command value Vref (t) by using the second correction value Ic2 and the current command value Iref(t) as inputs. That is, in the correction mode, the second correction value Ic2 that is a fixed value is used in place of the current measured value I(t). Accordingly, the effect of a change in the current measured value I(t) by a load change can be reduced. As described above, the second correction value Ic2 is, for example, the current measured value I(t−1) immediately before the load change occurs, and is supplied from the corrector 202. However, the second correction value Ic2 is not limited thereto. For example, the second PI controller 206 may generate the second correction value Ic2 based on the mode signal signal.

[Expression 6]

$$e2(t) = Iref(t) - Ic2 \tag{6}$$

Figure 4:
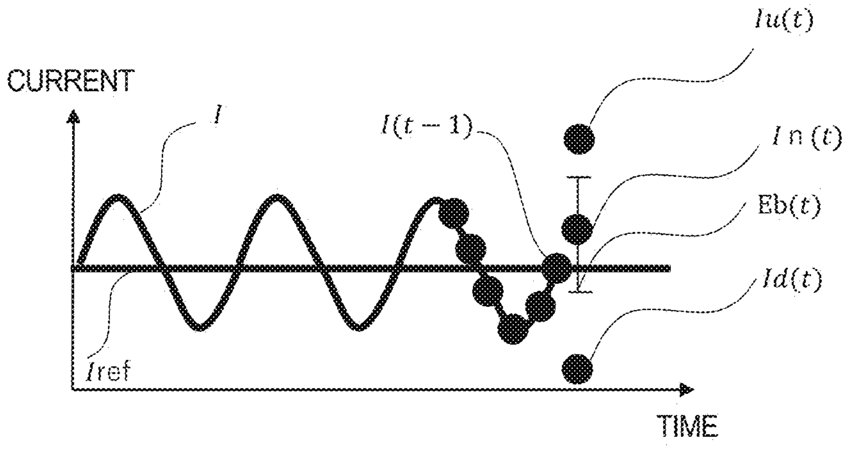
FIG. 4 is a diagram schematically illustrating a detection operation of a detector.

Here, details of an operation example of the detector 200 are described using FIG. 4 with reference to FIGS. 2 and 3. FIG. 4 is a diagram schematically illustrating a detection operation of the detector 200. The vertical axis represents a current, and the horizontal axis represents a time. As illustrated in FIG. 4, the detector 200 stores therein, for example, the current measured value I and the current command value Iref in chronological order. The detector 200 detects a change in load by using, for example, the correlation between the current measured value I that changes chronologically and load of the control target 30 that changes chronologically.

As represented by Circuit Equations (7) and (8) for a DC motor, a change in load torque caused by an external factor (disturbance) and increase and decrease in the current occur in the same direction. Here, V is a voltage supplied to the DC motor, K__t is a torque constant, T is a load torque, K_e is a back electromotive force constant, and N is a rotation number of the DC motor.

[Expression 7]

$$V = K\_e \times N + RI \quad (7)$$

[Expression 8]

$$T = K\_t \times I \quad (8)$$

The detector 200 uses, for example, the characteristics of Circuit Equations (7) and (8) and calculates a measurement range Eb(t) at normal times (at which load does not change) by using data of current measured values I(t−n) to I(t−1) and data of current command values Iref(t−n) to Iref(t−1) before the present control cycle t, where n is a natural number of 2 or more. As described above, the detector 200 estimates the measurement range Eb(t) of the next current measured value I(t) based on transitions of the current command values Iref(t−n) to Iref(t−1) and the current measured values I(t−n) to I(t−1).

The detector 200 outputs the mode signal signal indicating the normal mode when the current measured value I(t) is within the measurement range Eb(t). Meanwhile, the detector 200 outputs the mode signal signal indicating the correction mode when the current measured value Iu(t) or Id(t) is out of the measurement range Eb(t). The method of generating the measurement range Eb(t) is merely an example and is not limited thereto. For example, the detector 200 may generate an estimated value of the current measured value I(t) in the present control cycle t based on the transitions of the current command values Iref(t−n) to Iref (t−1) and the current measured values I(t−n) to I(t−1) and, when the difference between the current measured value I(t) and the estimated value is a threshold or more, change the present control cycle from the normal mode to the correction mode.

In a more simplified method, a value obtained by adding a difference Id between the current measured value I(t−1) and a current measured value I(t−2) to the current measured value I(t−1) is set as In(t), for example. Then, a range obtained by multiplying the difference Id by a predetermined coefficient Keb, which includes In(t) as its center and spreads in both ± directions, may be set as the measurement range Eb(t).

The detector 200 changes the correction mode to the normal mode, for example, when a deviation between the speed command value ωref(t) and the speed measured value ω(t), which is generated by a load change, is reduced. The detector 200 changes the correction mode to the normal mode when the sign of the difference value between the speed command value ωref(t) and the speed measured value ω(t) is changed with respect to the control cycle (t−1). Alternatively, the detector 200 may change the correction mode to the normal mode when the absolute value of the difference between the speed command value ωref(t) and the speed measured value ω(t) falls within a predetermined value. Further, the detector 200 may change the control mode at a time when the sign of reversal of the magnitude relation between the speed command value ωref(t) and the speed measured value ω(t) is caught by using, for example, the slope of the derivative of the speed measured value ω(t) or prediction by machine learning.

Here, reduction of control instability by the output from the corrector 202 is described. First, control stability realized by using the first correction value Ic1 is described. Since the speed measured value ω(t) decreases, for example, when load increases, the current command value Iref(t) tends to increase so as to cause the speed measured value ω(t) that has decreased because of the load increase to increase to the speed command value ωref(t) in a period until the correction mode is switched to the normal mode. That is, the integral term in Expression (1) tends to increase the current command value Iref(t). Meanwhile, immediately before switching from the correction mode to the normal mode, the absolute value of the difference between the speed command value ωref(t) and the speed measured value ω(t) is within a predetermined value and is stable. The value of the integral term in Expression (1) at this time may deviate significantly from the current measured value I(t) because it is a value that increased independently of the current measured value value I(t). If the integral term in Expression (1) is maintained in this state, the voltage command value Vref (t) generated by the second PI controller 206 using the current command value Iref(t) and the current measured value I(t) as inputs, and the speed measured value ω(t+1) in the next control cycle (t+1) may vary significantly.

Accordingly, the first PI controller 204 replaces the integral term in Expression (1) with the first correction value Ic1 according to Expression (3) at the time of switching from the correction mode to the normal mode. In other words, the current command value Iref(t) output from the first PI controller 204 at the time of switching from the correction mode to the normal mode is represented by Expression (9). That is, the error term represented by Expression (2) is added to the current measured value I(t) at the time of switching to the normal mode as the base. As is apparent from the above discussion, the current command value Iref(t) is output to be kept close to the current measured value I(t) with the difference between the speed command value ωref(t) and the speed measured value ω(t) reduced. It is thus possible to maintain the absolute value of the difference between the speed command value ωref(t) and the speed measured value ω(t) within the predetermined value even after switching to the normal mode.

[Expression 9]

$$Iref(t) = K1 \times (\omega ref(t) - \omega(t)) + I(t) \quad (9)$$

Figure 5:
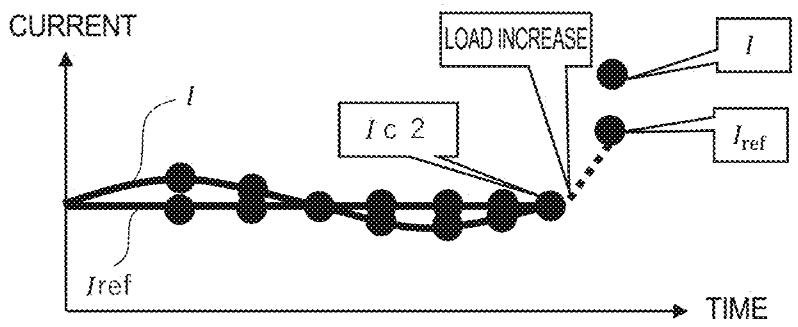
FIG. 5 is a diagram schematically explaining control instability of a second PI controller at the time of occurrence of a load change.

Next, control stability realized by using the second correction value Ic2 is described with reference to FIG. 5. FIG. 5 is a diagram schematically explaining control instability of the second PI controller 206 at the time of occurrence of a load change. As illustrated in FIG. 5, when a load change occurs because of an external factor, a phenomenon that the magnitude relation between the current command value Iref(t) and the current measured value I(t) is made unstable by, for example, a transient phenomenon may occur.

For example, in a case where the load of the control target 30 increases, Iref(t)>I(t) has to be established in order to raise voltage, and in a case where the load of the control target 30 decreases, Iref(t)<I(t) has to be established in order to lower the voltage. However, the magnitude relation becomes unstable when the load change occurs, and therefore Iref(t)<I(t) may be established in the case where the load increases. In such a case, the control target 30 is controlled in the opposite direction to the direction in which it should be controlled, so that the speed further decreases, and a time required for returning the speed to an original speed increases.

Meanwhile, Iref(t)>I(t) may be established in the case where the load of the control target 30 decreases. In such a case, the control target 30 is controlled in the opposite direction to the direction in which it should be controlled, so that the speed further increases, and the time required for returning the speed to the original speed increases.

Therefore, the corrector 202 outputs the current measured value Ic2 that is a fixed value as the second correction value to the second PI controller 206, as represented by Expression (6), when the control mode is changed to the correction mode. The corrector 202 is, for example, the current measured value I(t−1) immediately before the occurrence of a load change as described above, and the current measured value I(t−1) and the current command value Iref(t−1) have values close to each other.

Meanwhile, the current command value Iref(t) of the first PI controller 204 increases in order to return the speed, when the load increases. Therefore, the current command value Iref(t) becomes larger than the current measured value I(t−1) that is the second correction value, so that the voltage command value Vref (t) increases. Further, the current command value Iref(t) of the first PI controller 204 decreases in order to return the speed, when the load decreases. Therefore, the current command value Iref(t) becomes smaller than the current measured value I(t−1) that is the second correction value, so that the voltage command value Vref (t) decreases. As described above, by setting the second correction value Ic2 to, for example, the current measured value I(t−1) immediately before the occurrence of a load change, control of the control target 30 in the opposite direction to the direction in which it should be controlled is suppressed.

Figure 6:
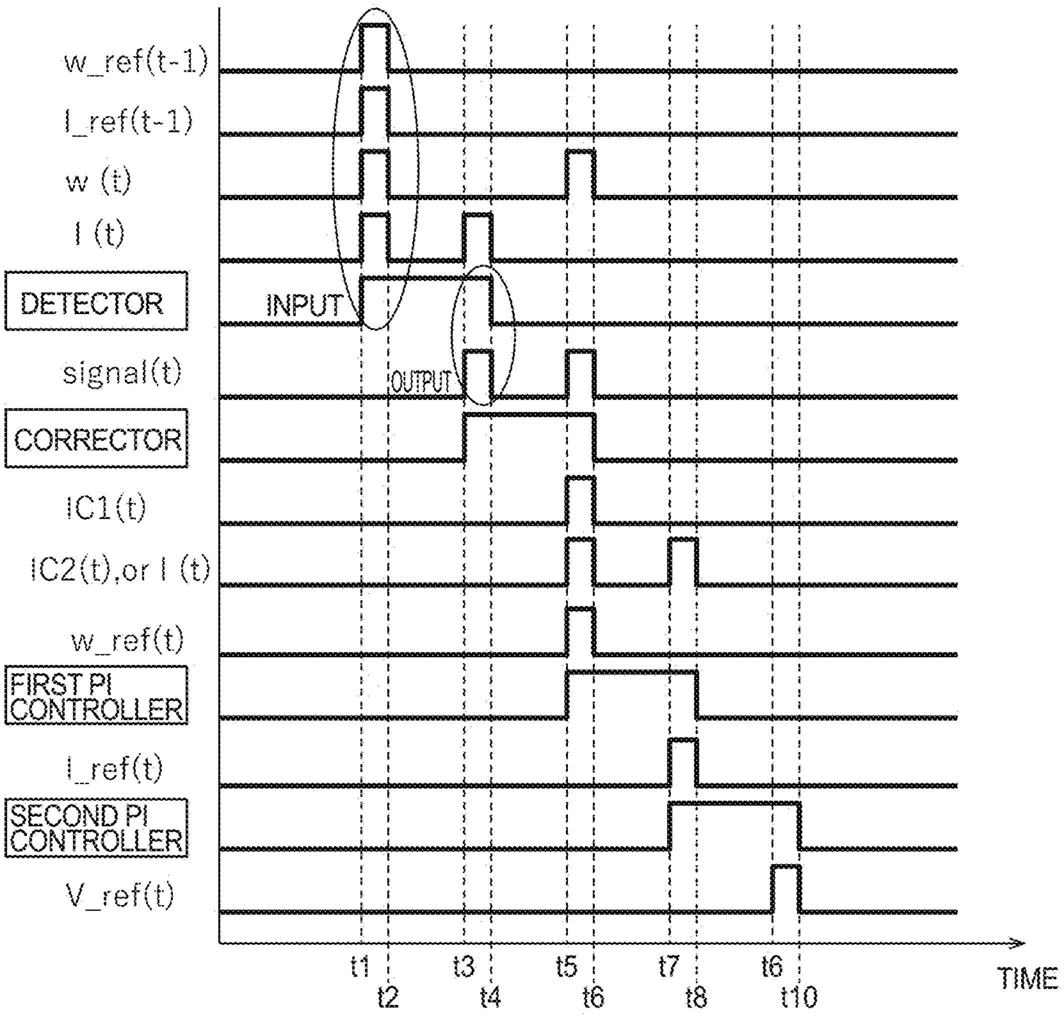
FIG. 6 is a timing chart illustrating an operation example of the control device in a control cycle.

Here, an operation example of the control device 20 according to the present embodiment in the control cycle t is described using FIG. 6 with reference to FIGS. 2 and 3. FIG. 6 is a timing chart illustrating the operation example of the control device 20 in the control cycle t. A period from a time t1 to a time t10 corresponds to one control cycle. An example is described here in which the corrector 202 outputs Ic2(t) that is the second correction value or the current measured value I(t) to the second PI controller 206. Further, the description is provided for a case where a storage element in a module can always store therein a signal input thereto while the control device 20 operates. Therefore, in a case where a signal is described as being at a high level in the following description, data input from the storage element in the module is possible.

FIG. 6 illustrates a speed command value ωref(t−1), the current command value Iref(t−1), the speed measured value ω(t), the current measured value I(t), the detector 200, the mode signal signal (t), the corrector 202, the first correction value Ic1(t), the second correction value Ic2(t), a speed command value ωref(t), the first PI controller 204, the current command value Iref(t), the second PI controller 206, and the voltage command value Vref (t) from top to bottom. A high level signal indicates that it is valid or an associated module is enabled, and a low level signal indicates that it is invalid or the associated module is disabled. The horizontal axis represents time. The validity of signal means signal input to an arithmetic unit of each module or signal output from the arithmetic unit of each module. The enabling of a module means a calculation operation period of the arithmetic unit of the module. The input to an arithmetic unit in the following description is either data stored in chronological order in an internal element of the module or an input from outside of the module.

First, the speed command value ref (t−1), the current command value Iref(t−1), the speed measured value ω(t), and the current measured value I(t) are input to an arithmetic unit of the detector 200 in a period from the time t1 to the time t2. When a mode signal signal (t−1) indicates a normal mode and the current measured value I(t) enters the measurement range Eb(t) (see FIG. 4) calculated for a calculation period (t−1), the arithmetic unit of the detector 200 outputs the mode signal signal (t) indicating the normal mode. Meanwhile, when the mode signal signal (t−1) indicates the normal mode and the current measured value I(t) does not enter the measurement range Eb(t) (see FIG. 4), the detector 200 outputs the mode signal signal (t) indicating the correction mode.

When the mode signal signal (t−1) indicates the correction mode and the absolute value of the difference between the speed measured value ω(t) and the speed measured value ω(t−1) is within a predetermined value, the arithmetic unit of the detector 200 outputs the mode signal signal (t) indicating the normal mode. On the other hand, when the mode signal signal (t−1) indicates the correction mode and the absolute value of the difference between the speed measured value ω(t) and the speed measured value ω(t−1) is not within the predetermined value, the arithmetic unit of the detector 200 outputs the mode signal signal (t) indicating the correction mode. Further, the arithmetic unit of the detector 200 calculates a measurement range Eb(t+1) between the time t1 and the time t4.

The current measured value I(t) and the mode signal signal (t) are input to the arithmetic unit of the corrector 202 between the time t3 and the time t4. When the mode signal signal (t−1) indicates the correction mode and the mode signal signal (t) indicates the normal mode, the arithmetic unit of the corrector 202 outputs the first correction value Ic1(t) that is equal to the current measured value I(t)/k2 as represented by Expression (3).

When the mode signal signal (t) indicates the correction mode, the arithmetic unit of the corrector 202 outputs the second correction value Ic2(t). The second correction value Ic2(t) is fixed to the current measured value Ic2 at the time at which the mode signal signal is changed from the normal mode to the correction mode. On the other hand, when the mode signal signal (t) indicates the normal mode, the arithmetic unit of the corrector 202 outputs the current measured value I(t).

The speed command value ωref(t), the speed measured value ω(t), and the mode signal signal (t) are input to the arithmetic unit of the first PI controller 204 between the time t5 and the time t6. When the mode signal signal (t−1) indicates the correction mode and the mode signal signal (t) indicates the normal mode, the arithmetic unit of the first PI controller 204 outputs the current command value Iref(t) according to Expression (9). Otherwise, the arithmetic unit of the first PI controller 204 outputs the current command value Iref(t) according to Expression (1).

The current command value Iref(t) and the second correction value Ic2(t) or the current measured value I(t) are input to the arithmetic unit of the second PI controller 206 between the time t7 and the time t8. When the mode signal signal (t) indicates the normal mode, the current measured value I(t) is input to the arithmetic unit of the second PI controller 206 and in turn outputs the voltage command value Vref (t) according to Expressions (4) and (5). On the other hand, when the mode signal signal (t) indicates the correction mode, the second correction value Ic2(t) is input to the arithmetic unit of the second PI controller 206 and in turn outputs the voltage command value Vref (t) according to Expressions (4) and (6). As described above, the control device 20 performs calculation in the detector 200, the corrector 202, the first PI controller 204, and the second PI controller 206 in this order as time passes. Accordingly, it is possible to correct calculation in the first PI controller 204 and calculation in the second PI controller 206 with the correction values Ic1 and Ic2 generated by the corrector 202 in accordance with the change of the control mode in the present control cycle t by the detector 200.

Figure 7:
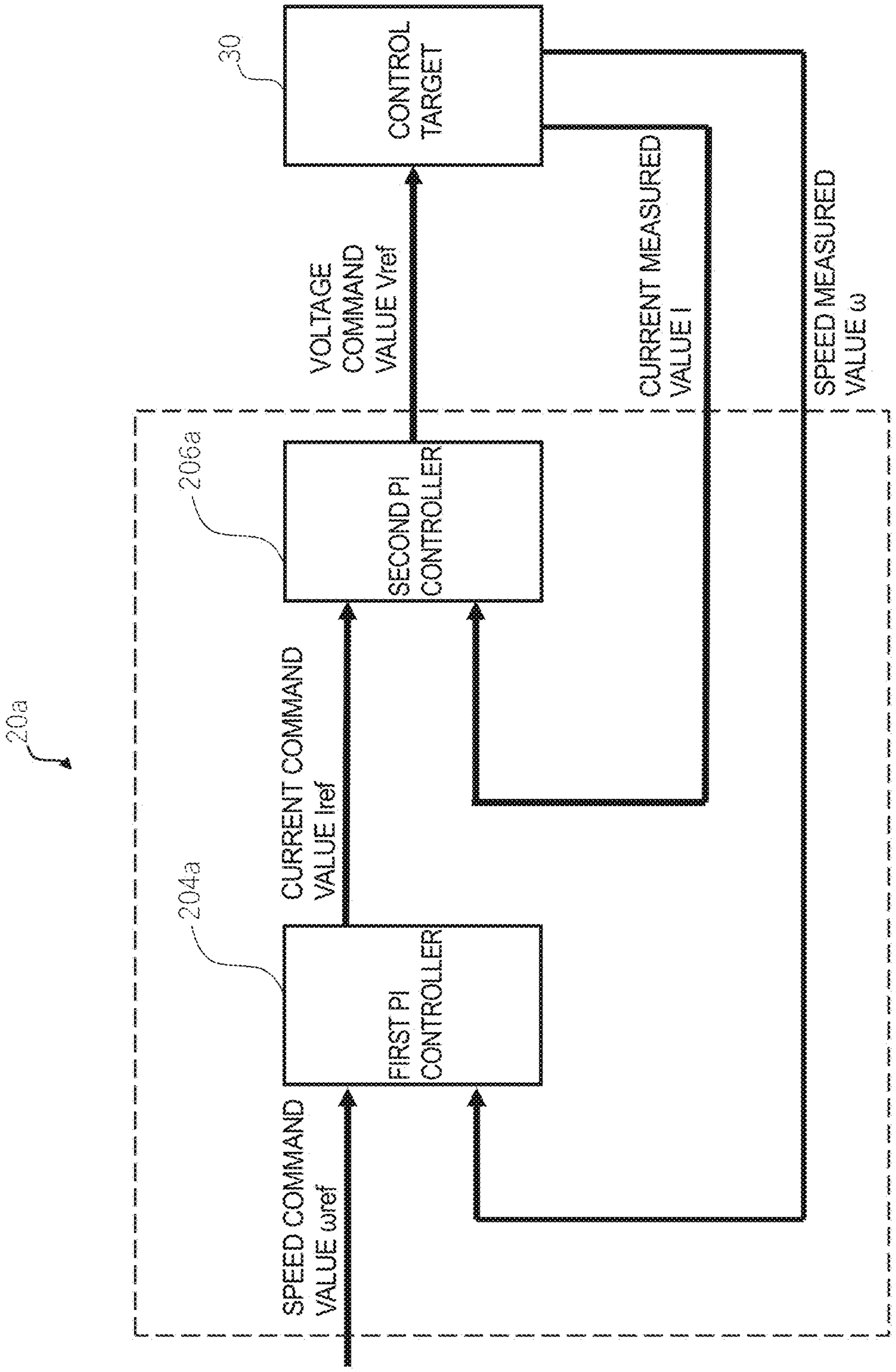
FIG. 7 is a block diagram illustrating a configuration example of a control device according to a comparative example.

FIG. 7 is a block diagram illustrating a configuration example of a control device 20*a* according to a comparative example. As illustrated in FIG. 7, the control device 20*a* includes a first PI controller 204*a* and a second PI controller 206*a*. The control device 20*a* according to the comparative example is different from the control device 20 according to the present embodiment in not including the detector 200 and the corrector 202. The first PI controller 204*a* and the second PI controller 206*a* according to the comparative example each perform a control operation equivalent to that in a case where the first PI controller 204 and the second PI controller 206 according to the present embodiment are caused to operate in the normal mode.

Figure 8:
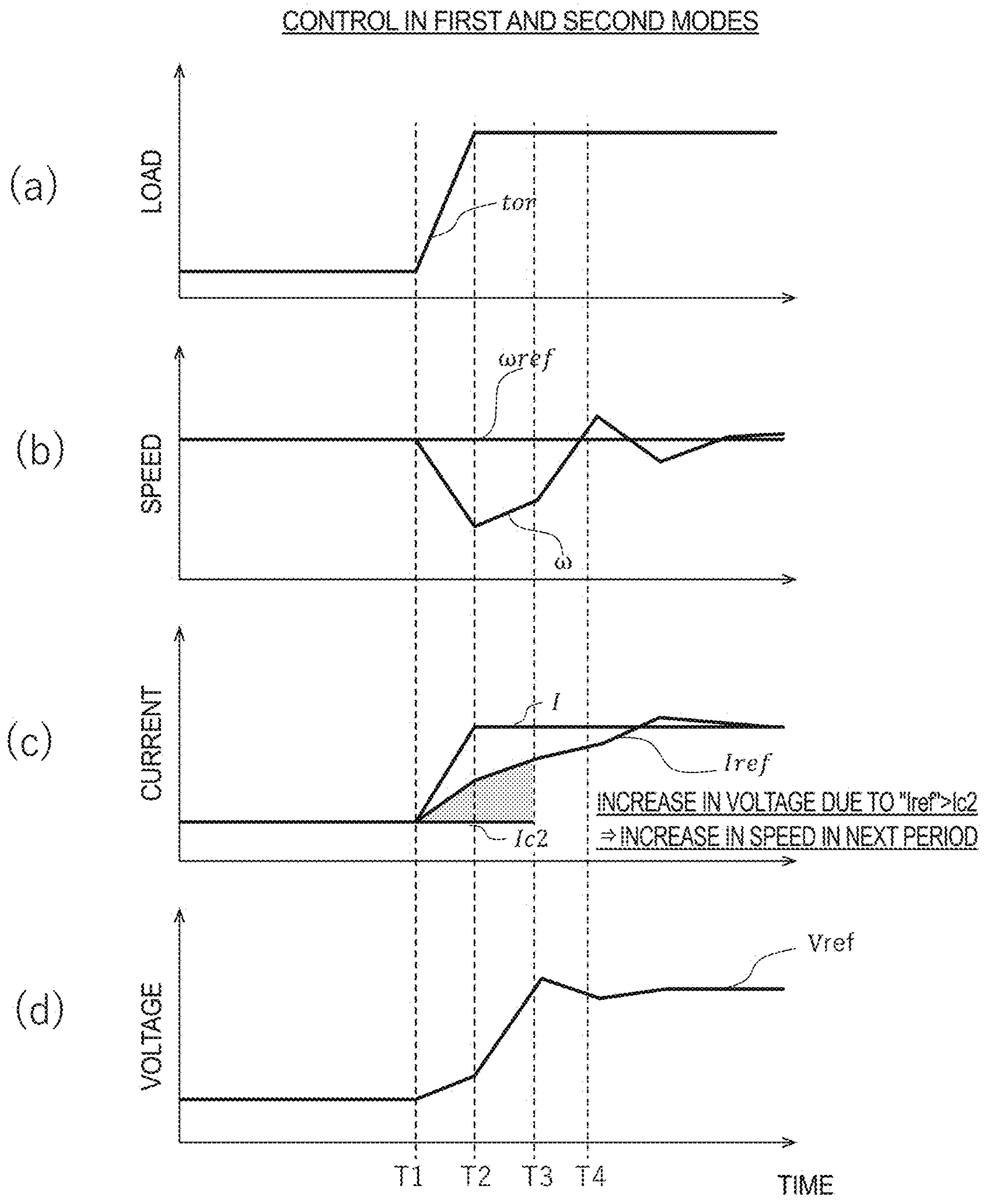
FIG. 8 are diagrams illustrating chronological changes in respective signals of the control device according to the present embodiment.

FIGS. 8A to 8D are diagrams illustrating chronological changes in respective signals of the control device 20 according to the present embodiment. The vertical axis in FIG. 8A represents a load torque tor of the control target 30. The vertical axis in FIG. 8B represents the speed measured value ω and the speed command value ωref. The vertical axis in FIG. 8C represents the current measured value I and the current command value Iref. The vertical axis in FIG. 8D represents the voltage command value Vref.

In the control device 20 according to the present embodiment, as illustrated in FIG. 8A, increase in the load torque tor of the control target 30 occurs because of an external factor between a time T1 to a time T2. In association with the increase in the load torque tor, as illustrated in FIG. 8B, a speed measured value ω(T) decreases. Meanwhile, a current command value Iref(T) increases because a speed command value ωref(T) is larger than the speed measured value ω(T).

As illustrated in FIG. 8C, the detector 200 outputs the mode signal signal indicating the correction mode at the time T2 at which a current measured value I(T) comes out of the measurement range Eb(t). The corrector 202 thus outputs a current measured value I(T1) at the time T1 as the second correction value Ic2 to the second PI controller 206.

As illustrated in FIG. 8D, since the current command value Iref(T) becomes larger than the second correction value Ic2 at the time T1, the voltage command value Vref output from the second PI controller 206 also increases. Accordingly, as illustrated in FIG. 8B, the speed ω starts to increase again at a time T3.

The detector 200 outputs the mode signal signal indicating the normal mode at a time T4 at which the speed measured value ω increases and the magnitude relation between the speed measured value ω and the speed command value ωref is reversed. The corrector 202 outputs the first correction value Ic1 (see Expression (3)) to the first PI controller 204 at the time T4. The first PI controller 204 replaces the integral value with the first correction value Ic1 (see Expression (9)) and executes control in the normal mode. Similarly, the second PI controller 206 transitions to control in the normal mode at the time T4. As illustrated in FIG. 8C, the current measured value I(T) and the current command value Iref(T) thus come close to each other asymptotically and become stable. Consequently, as illustrated in FIG. 8B, as time passes from the time T4, micro vibration of the speed measured value ω(T) converges, comes close to the speed command value ωref(T) asymptotically, and becomes stable.

Figure 9:
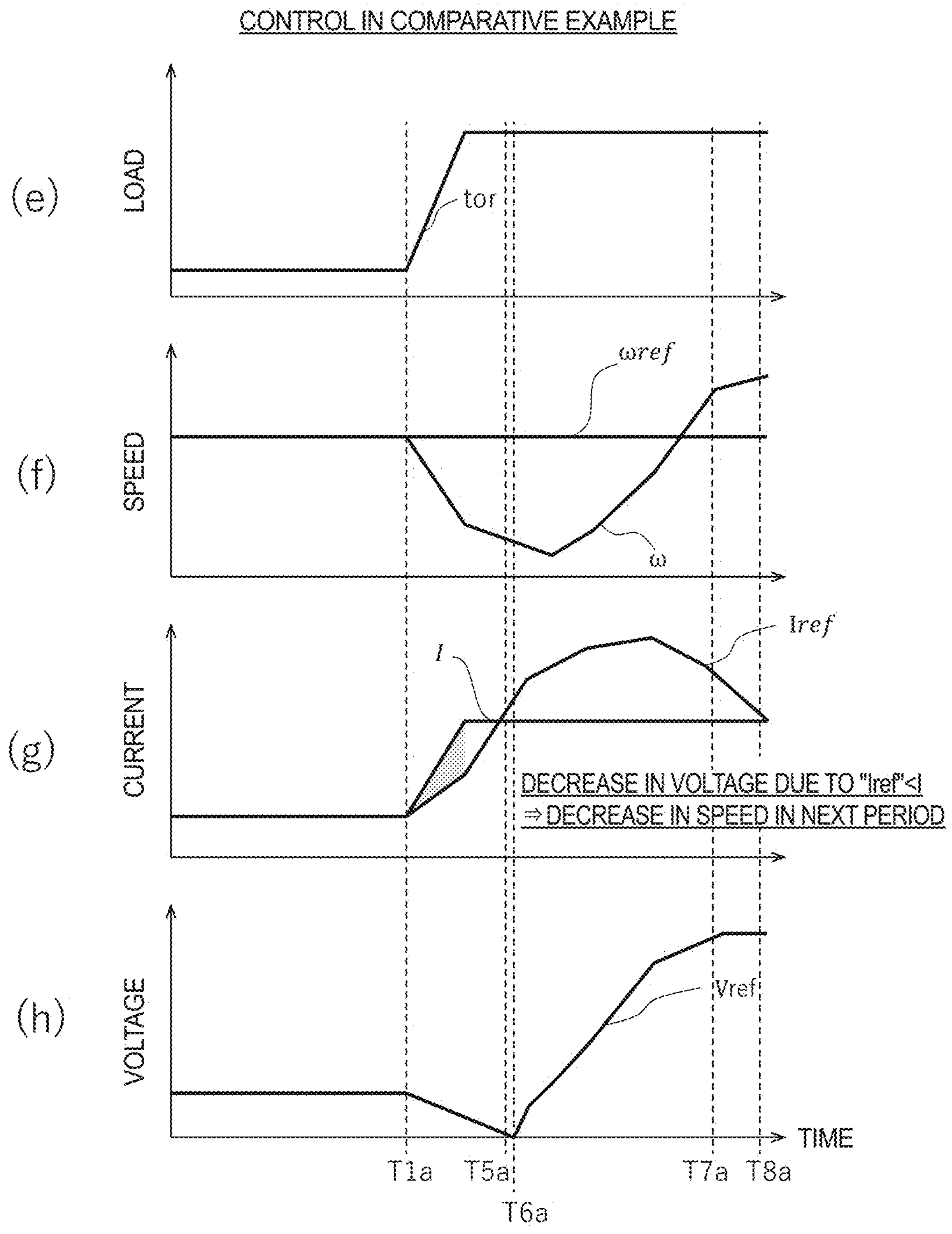
FIG. 9 are diagrams illustrating chronological changes in respective signals of the control device according to the comparative example.

FIGS. 9E to 9H are diagrams illustrating chronological changes in respective signals of the control device 20*a* according to the comparative example. The horizontal axis represents time. The vertical axis in FIG. 9E represents the load torque tor of the control target 30. The vertical axis in FIG. 9F represents the speed measured value ω and the speed command value ωref. The vertical axis in FIG. 9G represents the current measured value I and the current command value Iref. The vertical axis in FIG. 9H represents the voltage command value Vref.

As illustrated in FIG. 9E, in the comparative example, the load of the control target 30 increases between a time T1a and a time T5a. In association with this load increase, as illustrated in FIG. 9F, a speed measured value ω(Ta) decreases. On the other hand, a current command value Iref(Ta) increases because the speed command value ωref is larger than the speed measured value ω.

Meanwhile, in the comparative example, a state may be generated in which a current measured value I(Ta) is larger than the current command value Iref(Ta) even when the load increases after the time T1, as illustrated in FIG. 9G, because the control mode remains the normal mode even when a load change occurs. A voltage command value Vref (Ta) thus decreases as illustrated in FIG. 9H despite the decrease in the speed w. Consequently, the speed measured value ω further decreases as illustrated in FIG. 9F. Meanwhile, in the control device 20 according to the present embodiment, when a load change occurs, the second PI controller 206 uses the second correction value Ic2 as described above, and thus control instability is reduced.

Referring back to FIG. 9G, the current command value Iref(Ta) that continues to increase becomes larger than the current measured value I(Ta) at a time T6a. Accordingly, as illustrated in FIG. 9H, the voltage command value Vref (Ta) starts to increase at the time T6a. Therefore, as illustrated in FIG. 9F, the speed measured value ω starts to increase after the time T6a.

As illustrated in FIG. 9F, the magnitude relation between the speed measured value ω(Ta) and the speed command value ωref(Ta) is reversed at a time T7a. In the comparative example, however, as illustrated in FIG. 9G, the first PI controller 204 maintains a state in which the current command value Iref(Ta) is larger than the current measured value I(Ta) until a time T8a because of the effect of the integral term (see Expression (1)). Accordingly, as illustrated in FIG. 9F, the speed measured value @ (Ta) exceeds the speed command value ωref(Ta) this time. As described above, the speed measured value ω repeats vibration in the comparative example, and it takes time until the speed measured value ω converges to the speed command value ωref. Meanwhile, in the control device 20 according to the present embodiment, the first PI controller 204 replaces the integral value of the integral term with the first correction value (see Expression (3)) as described above. Therefore, micro vibration of the speed measured value ω(T) converges (see Expression (9)), and the speed measured value ω(T) comes close to the speed command value ωref(T) asymptotically and becomes stable.

Figure 10:
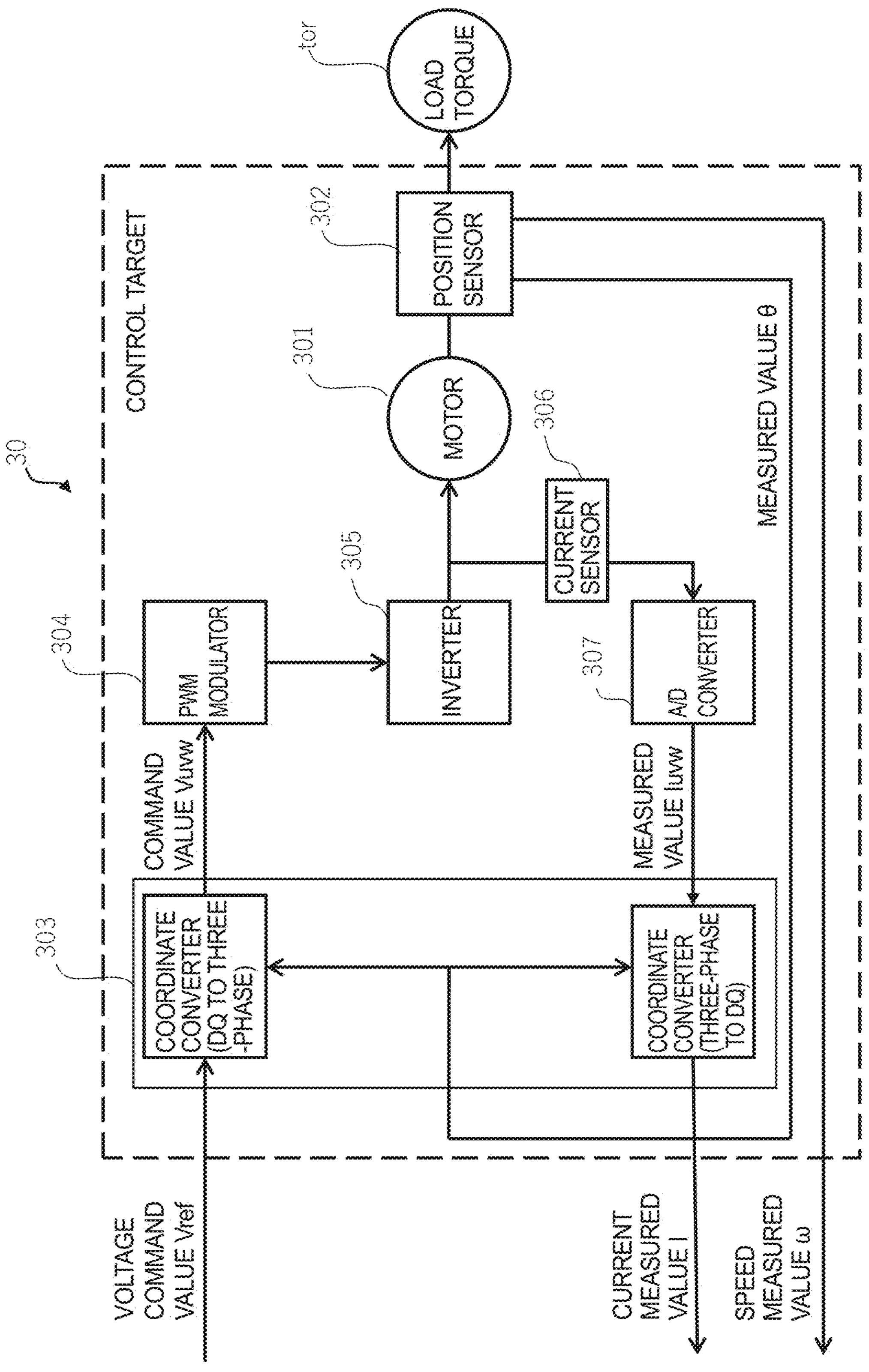
FIG. 10 is a diagram illustrating a configuration example of a control target.

FIG. 10 is a diagram illustrating a configuration example of a control target. As illustrated in FIG. 10, the control target 30 includes, for example, a motor 301, a position sensor 302, a coordinate converter 303, a PWM modulator 304, an inverter 305, a current sensor 306, and an A/D converter 307. For example, to the permanent magnet synchronous motor 301 (hereinafter, "the motor 301") that is a brushless DC motor, the position sensor 302 is attached for detecting the rotation position of a rotor. The position sensor 302 detects and outputs an electrical angle θ and the rotation number w that is a speed measured value. The load torque tor is connected to the motor as load.

The electrical angle θ is input to the coordinate converter 303. The coordinate converter 303 converts the voltage command value Vref to three-phase voltage command values Vuvw based on the electrical angle θ and outputs them to the PWM modulator 304. The PWM modulator 304 generates three-phase PWM signals based on the three-phase voltage command values Vuvw and outputs them to the inverter 305 (power converter). An output terminal for each phase of the inverter 305 is connected to a winding for each phase of the motor 301.

Each phase current detected by the current sensor 306 is subjected to A/D conversion by the A/D converter 307 and output to the coordinate converter 303. The coordinate converter 303 outputs the current measured value I. Although subscripts DQ indicate a vector represented by the DQ coordinate system, they are not limited thereto. The one or more subscripts may be one or more scalar values in which necessary information is included.

Figure 11:
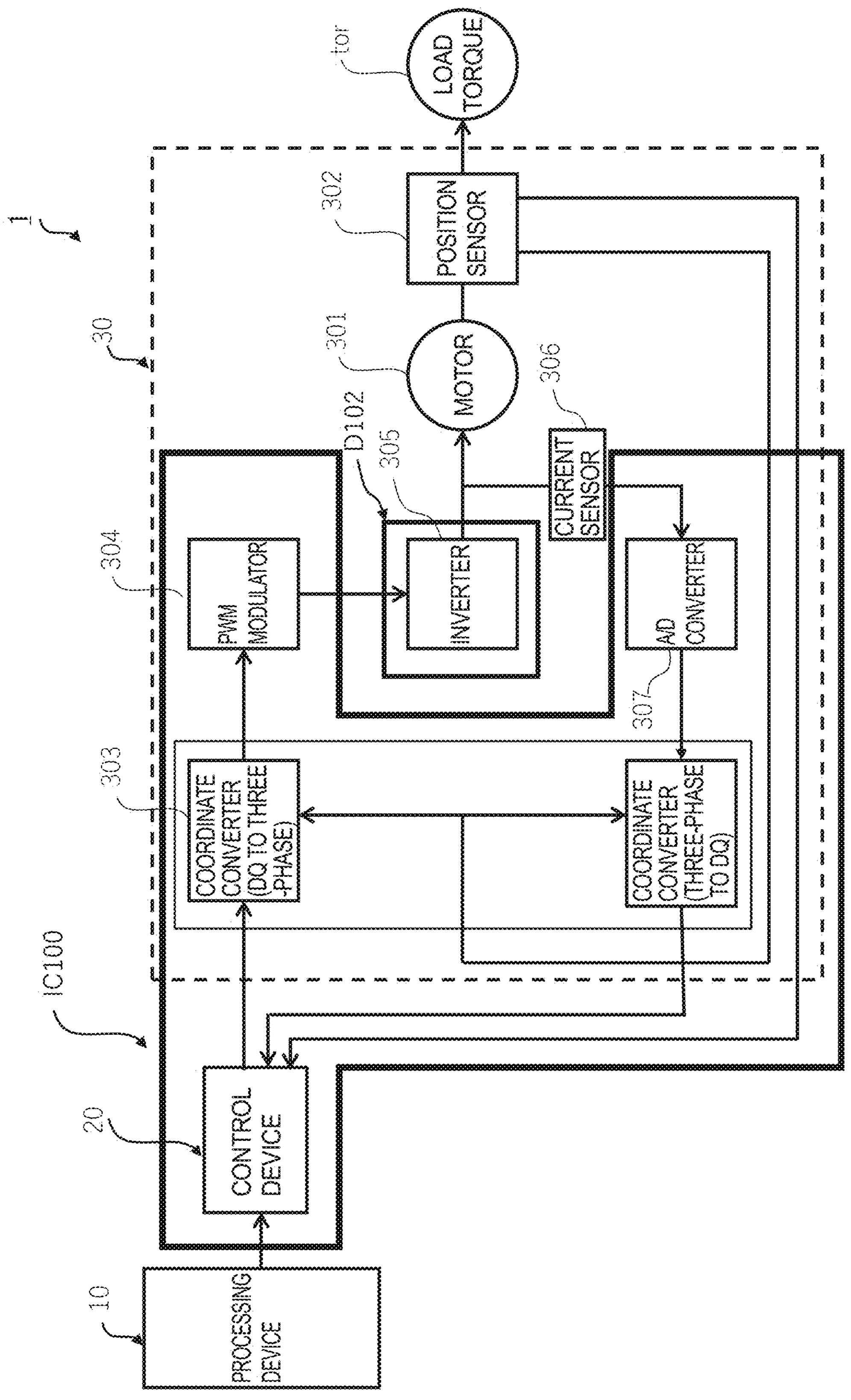
FIG. 11 is a diagram illustrating a circuit configuration example of the control system.

FIG. 11 is a diagram illustrating a circuit configuration example of the control system 1. The control device 20 and a part of the control target 30 are configured as a microprocessor-based controller IC100 that has an MCU (Micro Controller Unit). For example, the control device 20, the coordinate converter 303, the PWM modulator 304, and the A/D converter 307 are configured as the MCU (Micro Controller Unit). The inverter 305 is configured as a driver board D102. As described above, the detector 200, the corrector 202, the first PI controller 204, and the second PI controller 206 included in the control device 20 can be configured integrally as an MCU.

Figure 12:
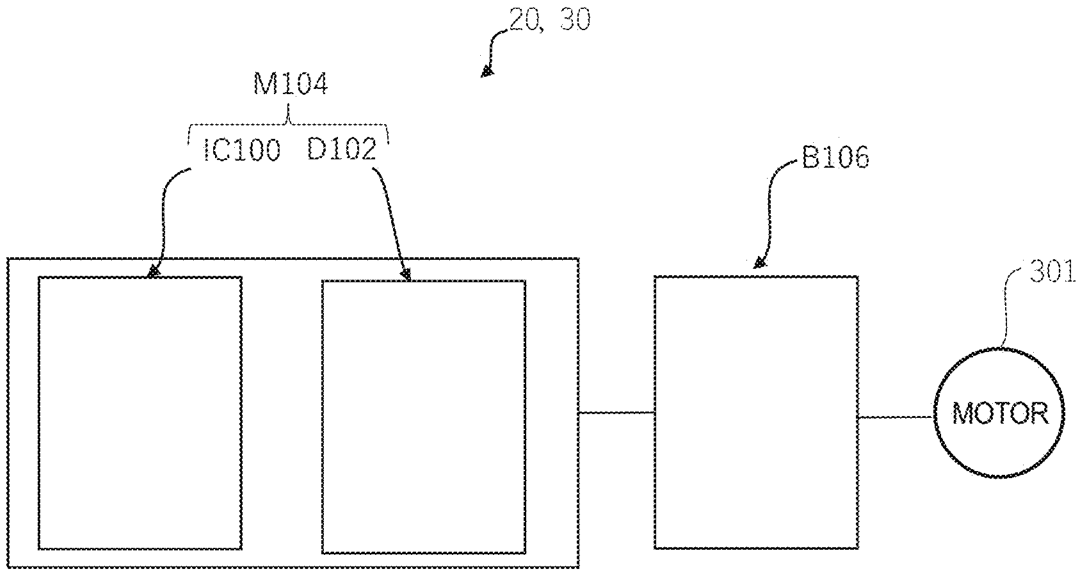
FIG. 12 is a diagram illustrating an example in which a controller and a driver board are configured as a microcomputer-mounted board.

FIG. 12 is a diagram illustrating a circuit board example of the control system 1. This example is an example in which the controller IC100 and the driver board D102 are configured as a microcomputer-mounted board. A microcomputer-mounted board M104 includes the controller IC100 and the driver board D102 mounted thereon. The position sensor 302 and the current sensor 306 are configured as a sensor board B106. The sensor board B106 is configured by, for example, a field effect transistor (FET) and a high-performance semiconductor power switch (PD: Intelligent Power Device). As described above, the control device 20 and a part of the control target 30 can be configured integrally as a circuit board.

Figure 13:
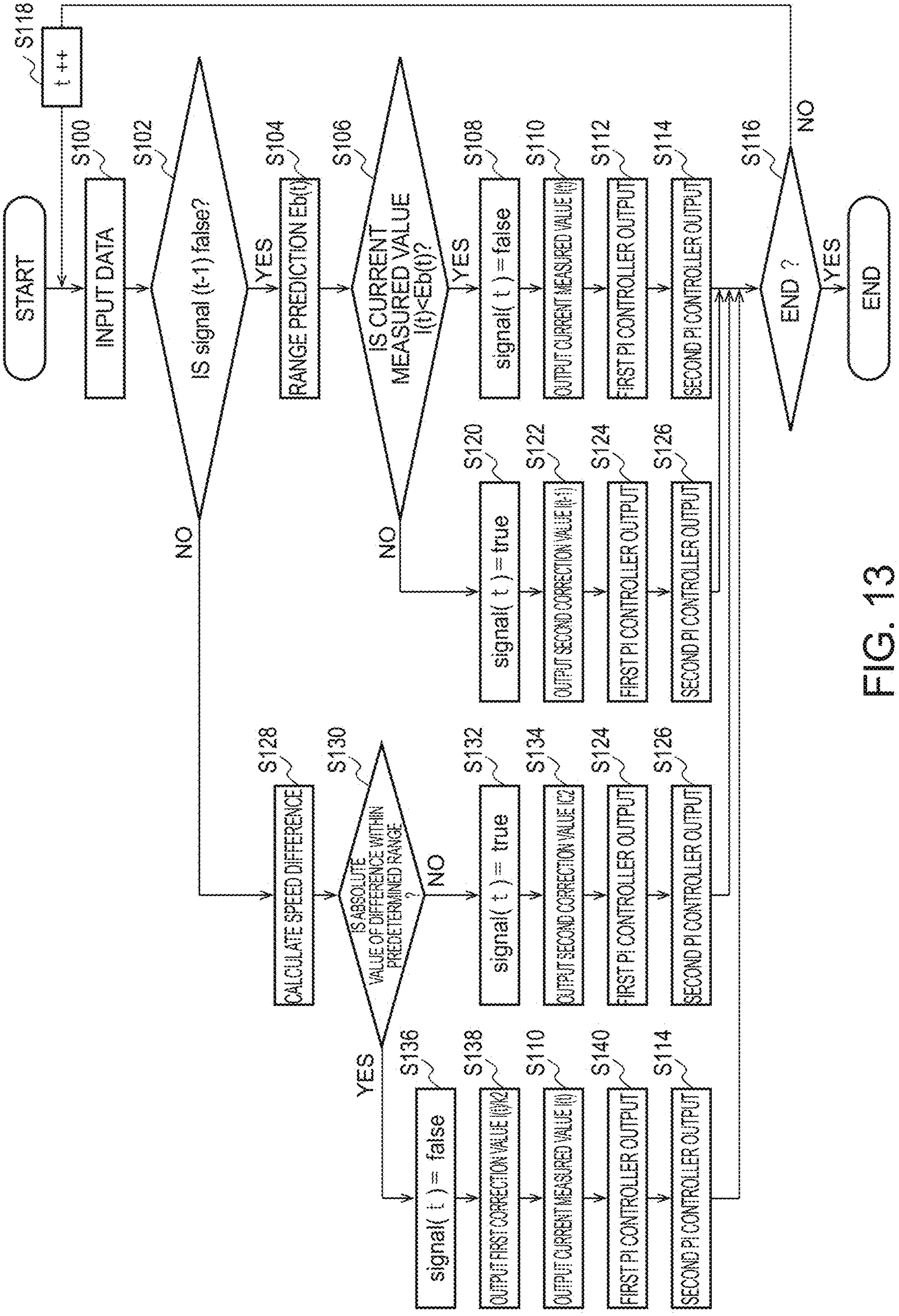
FIG. 13 is a flowchart of a process example by the control device.

FIG. 13 is a flowchart of a process example by the control device 20. Description is provided by referring to an example in which the control cycle t changes to 1, 2, 3, 4, . . . chronologically. It is described assuming that at the start of control, t is 1 and the control mode is the normal mode (signal is false). As described above, as illustrated in FIG. 6, one control cycle corresponds to the period from the time t1 to the time t10.

First, the speed command value ωref(t−1), the current command value Iref(t−1), the speed measured value ω(t), the current measured value I(t), and the mode signal signal (t−1) are input to an arithmetic unit of the detector 200 (Step S100). Subsequently, the detector 200 determines whether the mode signal signal (t−1) of the present control cycle indicates the normal mode (false) or the correction mode (true) (Step S102). The value of the mode signal signal (t−1) of a previous control cycle is retained in the storage element in the detector 200 and, at the start of a detection process in the present control cycle t, indicates the mode of the present control cycle. Meanwhile, at the end of the detection process in the present control cycle t, the value of the mode signal signal (t) of the control cycle indicates the mode of the present control cycle.

When determining that the mode signal signal (t−1) indicates the normal mode (false) (YES at Step S102), the detector 200 calculates the range prediction Eb(t) (Step S104). The detector 200 then determines whether the current measured value I(t) is in the range prediction Eb(t) (Step S106). When determining that the current measured value I(t) is in the range prediction Eb(t) (YES at Step S106), the detector 200 sets the mode signal signal (t) to the normal mode (false). The mode signal signal (t) is input to the arithmetic unit of the corrector 202 (Step S108), and the current measured value I(t) is output to the second PI controller 206 (Step S110).

The first PI controller 204 calculates the current command value Iref(t) according to Expression (1) by using the speed measured value ω(t) and the speed command value ωref(t) and outputs the current command value Iref(t) to the second PI controller 206 (Step S112). Next, the second PI controller 206 calculates the voltage command value Vref (t) according to Expressions (4) and (5) by using the current measured value I(t) and the current command value Iref(t) and outputs the voltage command value Vref (t) to the control target 30 (Step S114). Subsequently, when the processing device 10 does not end the control process (NO at Step S116), t is incremented by 1 (Step S118), and control from Step S100 is repeated. When the processing device 10 ends the control process (YES at Step S116), control by the control device 20 is ended.

Meanwhile, when determining that the current measured value I(t) is out of the range prediction Eb(t) (NO at Step S106), the detector 200 sets the mode signal signal (t) to the correction mode (true). The mode signal signal (t) is input to the arithmetic unit of the corrector 202 (Step S120), and I(t−1) is output to the second PI controller 206 as the second correction value Ic2 (Step S122). The corrector 202 retains and outputs the second correction value Ic2 until the mode signal signal (t) becomes the normal mode (false).

Next, the first PI controller 204 calculates the current command value Iref(t) according to Expression (1) by using the speed measured value ω(t) and the speed command value ωref(t) and outputs the current command value Iref(t) to the second PI controller 206 (Step S124). Next, the second PI controller 206 calculates the voltage command value Vref (t) according to Expressions (4) and (6) by using the second correction value I(t−1) and the current command value Iref(t) and outputs the voltage command value Vref (t) to the control target 30 (Step S126).

Meanwhile, when determining that the mode signal signal (t−1) before the control period is the correction mode (true) (NO at Step S102), the detector 200 calculates the absolute value of the difference between the speed command value ωref(t) and the speed measured value ω(t) (Step S128). The detector 200 then determines whether the sign of the difference value is changed or the absolute value of the difference is within a predetermined value (Step S106). For example, the detector 200 determines whether the sign of the difference value is changed or the absolute value of the difference is within 5 percent of the speed command value ωref(t).

When determining that the absolute value of the difference is not within the predetermined value (NO at Step S130), the detector 200 sets the mode signal signal (t) to the correction mode (true). The mode signal signal (t) is input to the arithmetic unit of the corrector 202 (Step S132), and the second correction value Ic2 is output to the second PI controller 206 (Step S134). The first PI controller 204 and the second PI controller 206 perform calculation identical to calculation at Steps S124 and S126.

On the other hand, when determining that the absolute value is within the predetermined value (YES at Step S130), the detector 200 sets the mode signal signal (t) to the normal mode (false). The mode signal signal (t) is input to the arithmetic unit of the corrector 202 (Step S136), and I(t)/k2 is output to the first PI controller 204 as the first correction value Ic1 (Step S138). The corrector 202 also outputs the current measured value I(t) to the second PI controller 206 (Step S110).

The first PI controller 204 performs calculation according to Expression (9) by using the first correction value Ic1, the speed measured value ω(t), and the speed command value ωref(t) to obtain the current command value Iref(t) and outputs the current command value Iref(t) to the second PI controller 206 (Step S140). The second PI controller 206 performs calculation identical to that at Step S114.

As described above, according to the present embodiment, a configuration is employed in which the detector 200 detects a change in the current measured value I caused by an external factor of the control target 30 and changes the control mode to the correction mode, and the corrector 202 supplies the second correction value Ic2 that corrects the output of the second PI controller 206 in accordance with the change to the correction mode. Accordingly, the second PI controller 206 can execute control using the second correction value Ic2 in place of the current measured value I in a state where the change caused by the external factor of the control terminal 30 occurs, so that it is possible to reduce control instability caused by the change caused by the external factor of the control target 30.

At least a part of the control device 20 explained in the above embodiment may be configured by hardware or software. In a case where at least a part of the control device 20 is configured by software, it is permissible to store a program realizing at least a part of the functions of the control device 20 in a recording medium such as a flexible disk or a CD-ROM and load the program into a computer to be executed thereby. The recording medium is not limited to detachable ones such as a magnetic disk or an optical disk, and may be a solid-state recording medium such as a hard disk and a memory.

The program realizing at least a part of the functions of the control device 20 may be distributed via a communication line (including wireless communication) such as the Internet. Further, the program may be distributed via a wired line or a wireless line such as the Internet or may be distributed while being stored in a recording medium in a state in which the program is encrypted, modulated, or compressed.

While certain embodiments have been described, these embodiments have been presented with reference to example only, and are not intended to limit the scope of the invention. The novel devices, methods, and programs described herein may be embodied in a variety of other forms. Furthermore, various omissions, substitutions, and changes may be made in the devices, the methods, and the programs described in the present specification without departing from the spirit of the invention.

The invention claimed is:

1. A control device controlling a control target, comprising:

a first controller configured to, by using a first measured value measured for the control target and a first command value that is a target value of the first measured value as inputs, generate a second command value;

a second controller configured to, by using a second measured value measured for the control target and the second command value as inputs, generate a target value supplied to the control target as a third command value;

a detector configured to detect a change in the second measured value caused by an external factor of the control target and to change a control mode; and a corrector configured to generate a second correction value and correct the second controller in accordance with the control mode.

2. The device of claim 1, wherein the control mode includes at least either a first mode or a second mode, and control of the control target is feedback control in which a predetermined control cycle is repeated, and the second controller generates the third command value by using the second measured value and the second command value as inputs when a present control cycle is the first mode, and generates the third command value by using the second correction value and the second command value as inputs when the present control cycle is the second mode.

3. The device of claim 2, wherein the corrector outputs the second measured value to the second controller when in the first mode and outputs the second correction value to the second controller when in the second mode.

4. The device of claim 2, wherein the detector changes a present control cycle from the first mode to the second mode, when the present control cycle is the first mode and the second measured value changes regardless of a transition of the second command value.

5. The device of claim 2, wherein the detector generates an estimated value of the second measured value in a present control cycle based on transitions of the second measured value and the second command value in past control cycles, and changes the present control cycle from the first mode to the second mode when a difference between the second measured value and the estimated value is a threshold or more.

6. The device of claim 2, wherein the detector estimates a range of the second measured value in a present control cycle based on transitions of the second measured value and the second command value in past control cycles, and changes the present control cycle from the first mode to the second mode when the second measured value is out of the range.

7. The device of claim 2, wherein the detector changes a present control cycle from the second mode to the first mode, when the present control cycle is the second mode and a sign of a difference value between the first measured value and the first command value is changed.

8. The device of claim 2, wherein the corrector retains and outputs the second measured value measured in a period of a control cycle immediately before a present control cycle as the second correction value, when the present control cycle is changed from the first mode to the second mode.

9. The device of claim 2, wherein the corrector retains and outputs the second measured value in a period in which a change is a predetermined value or less in past control cycles as the second correction value, when a present control cycle is changed from the first mode to the second mode.

10. The device of claim 9, wherein the first controller generates the second command value of a present control cycle based on a present difference value between the first measured value and the first command value in the present control cycle and an integral value obtained by integrating past difference values between the first measured values and the first command values in past control cycles, the corrector outputs a first correction value based on the second measured value of the present control cycle to the first controller when the second mode changes to the first mode, and the first controller generates the second command value based on the present difference value and the first correction value when the second mode changes to the first mode.

11. The device of claim 1, wherein the control target is a DC motor, the first measured value is a measured rotation speed of the DC motor, the second command value is a target value of a current, the second measured value is a measured current value of the DC motor, and the third command value is a target value of a voltage supplied to the DC motor.

12. A control method controlling a control target, comprising:

generating, by using a first measured value measured for the control target and a first command value that is a target value of the first measured value as inputs, a second command value;

generating, by using a second measured value measured for the control target and the second command value as inputs, a target value supplied to the control target as a third command value;

detecting a change in the second measured value caused by an external factor of the control target and changing a control mode; and generating a second correction value and correcting generation of the third command value in accordance with the control mode.

13. A control system including a DC motor and a control device controlling the DC motor, wherein the control device includes a first controller configured to, by using a first measured value that is a measured rotation speed of the DC motor and a first command value that is a target value of the first measured value as inputs, generate a target value of a current as a second command value, a second controller configured to, by using a second measured value that is a measured current value of the DC motor and the second command value as inputs, generate a target value of a voltage supplied to the DC motor as a third command value, a detector configured to detect a change in the second measured value caused by an external factor of the DC motor and to change a control mode, and a corrector configured to generate a second correction value and correct the second controller in accordance with the control mode.

14. The system of claim 13, wherein the control mode includes at least either a first mode or a second mode, and control of the DC motor is feedback control in which a predetermined control cycle is repeated, and the second controller generates the third command value by using the second measured value and the second command value as inputs when a present control cycle is the first mode, and generates the third command value by using the second correction value and the second command value as inputs when the present control cycle is the second mode.

15. The system of claim 14, wherein the corrector outputs the second measured value to the second controller when in the first mode and outputs the second correction value to the second controller when in the second mode.

16. The system of claim 14, wherein the detector changes a present control cycle from the first mode to the second mode, when the present control cycle is the first mode and the second measured value changes regardless of a transition of the second command value.

17. The system of claim 14, wherein the detector generates an estimated value of the second measured value in a present control cycle based on transitions of the second measured value and the second command value in past control cycles, and changes the present control cycle from the first mode to the second mode when a difference between the second measured value and the estimated value is a threshold or more.

18. The system of claim 14, wherein the detector estimates a range of the second measured value in a present control cycle based on transitions of the second measured value and the second command value in past control cycles, and changes the present control cycle from the first mode to the second mode when the second measured value is out of the range.

19. The system of claim 14, wherein the detector changes a present control cycle from the second mode to the first mode, when the present control cycle is the second mode and a sign of a difference value between the first measured value and the first command value is changed.

20. The system of claim 14, wherein the corrector retains and outputs the second measured value measured in a period of a control cycle immediately before a present control cycle as the second correction value, when the present control cycle is changed from the first mode to the second mode.

* * * * *